United States Patent Office 3,079,363
Patented Feb. 26, 1963

3,079,363
VANADIUM COMPOUNDS AS PROMOTERS FOR TERTIARY ARALKYL HYDROPEROXIDE CATALYSIS OF UNSATURATED POLYESTER RESINS
Stanley D. Koch, Boston, Mass., and George L. Greenfield, Fort Worth, Tex., assignors to Allied Chemical Corporation, a corporation of New York
No Drawing. Filed Nov. 13, 1957, Ser. No. 696,038
5 Claims. (Cl. 260—45.4)

This invention relates generally to methods of effecting cure of polyester resins and to the production of polymerizable polyester compositions suitable for rapid curing. More particularly, the invention relates to methods of effecting gelation and final cure of certain peroxy-catalyzed unsaturated polyester resin compositions by the use of specific substances that cause the acceleration of the function of the catalysts, and to the production of unsaturated polymerizable polyester compositions containing such catalyst accelerators and suitable for rapid gelation and final curing by the incorporation therewith of a peroxy catalyst of a specific class.

The term "unsaturated polyester resin composition" is used herein in the general sense it now conveys in the art; namely, to refer generally to those compositions that comprise a polymerizable unsaturated polycarboxylic acid-polyhydric alcohol polyester, which is prepared by an esterification reaction between one or more polybasic acids, at least one of which is unsaturated, and one or more polyhydric alcohols. Such compositions preferably comprise also a copolymerizable monomeric substance that contains at least one $CH_2=C<$ group.

In general, unsaturated polyester resin compositions of the type referred to cure or harden very slowly. This characteristic originally limited utility of such resins insofar as commercial use was concerned. However, it has been conventional in the art for some time to add a catalyst, usually some type of peroxy compound, prior to use of the polyester composition, whereby the rate of cure is greatly increased. As a result, polyester resin compositions have found wide applicability in the molding, laminating, casting, coating, and other fields.

It is considered a proven fact in the art that peroxy compounds, when used as catalysts for unsaturated polyester resin compositions, initiate the formation of free radicals which, in turn, hasten hardening or cure by increasing the rate of final polymerization of such compositions through their olefinic unsaturated double bonds. Most frequently, heat is also required to set off the decomposition of the peroxy compound to thus form the first free radical which then, in turn, forms additional free radicals from the polyester molecule, whereby polymerization thereof proceeds at a comparatively rapid rate. Some peroxy catalysts are more active than others and may not require the addition of heat to initiate decomposition thereof.

However, in many cases, means other than heat, or in addition thereto, are used for inducing decomposition of the peroxy compounds and thereby accelerate the catalytic action thereof. Such other means comprise the use of certain compounds that induce such decomposition of peroxy compounds and which have come to be known as "promoters" or "accelerators" therefor.

The art has progressed to the extent that workers therein have set up general classes of substances to cover groups thereof that have been found to function with greatly varying effects as promoters for peroxy-catalyzed unsaturated polyester compositions, although the particular use of a given substance (or group of substances) that happens to fall within these general classes may not be predicted with any degree of certainty, nor are the classes considered complete. Thus, as their unique functions have been discovered, substances have come to be grouped into these six general classes: (1) metal systems; e.g., cobalt naphthenate, iron naphthenate, ferrous phenanthroline complexes, etc.; (2) Lewis acids; e.g., boron fluoride dihydrate, ferric chloride, perchloric acid etc.; (3) bases; e.g., tetraethanol ammonium hydroxide, tetramethylammonium hydroxide, etc.; (4) amines; e.g., dimethylaniline, 2-aminopyridine, diethylaniline, etc.; (5) quaternary salts; e.g., trimethyl benzyl ammonium chloride, tris-(p-chlorophenyl)-benzylphosphonium chloride, tetrakismethylol phosphonium chloride, etc.; and (6) mercaptans, e.g., no-dodecylmercaptan, tert-dodecylmercaptan, n-heptylmercaptan, 2-mercaptoethanol, etc. Certain other substances, of a more or less miscellaneous nature, do not fall within any of the above categories, but have been found to have some promotive effect on certain peroxy catalysts; e.g., sodium sulfoxylate formaldehyde, chlorotriphenylmethane, ascorbic acid, isoascorbic acid, etc.

As indicated previously, some of the known "peroxy-promoted" combinations require some heat anyway, while others do not. These latter combinations are particularly advantageous for certain applications inasmuch as room temperature hardening or cure of polyester compositions can be achieved.

There are several criteria for determining the comparative worth or relative effectiveness of peroxy-catalyst promoter systems. For example, the criteria relied upon in the Standard Society of the Plastic Industry (SPI) hardening tests are useful for such comparisons. The tests are commonly referred to in group as the SPI Gel-Time Determination. Briefly, the tests involve determination of the time temperature characteristics of a particular resin sample solution containing a known amount of catalyst and a known amount of a particular promoter. More particularly, one of these criteria determined in the aforesaid test is "gel time" which is the time interval measured that it takes for the resin sample solution to pass from 150° F. to 190° F. wherein greater promotive power is reflected in shorter "gel time." Another is "time of exotherm," which is the time interval measured from the time the sample attains a temperature of 150° F. until the highest or peak temperature is attained, the shortness of such time similarly indicating the degree of promotive power. Still another criterion is "peak exotherm," which is the actual highest temperature reached by the resin sample solution during cure. This last value, in addition to indicating the promotive power of a substance used for such purpose, indicates the likelihood that the resin will cure to an acceptable rigid state under room temperature conditions and within a reasonable time, the comparison, however, being taken under elevated temperature curing conditions.

In addition to the foregoing, the room temperature pot life of polyester resin solutions containing predetermined amounts of catalyst and promoter is also of importance in determining the efficacy of a catalyst-promoter system. Pot life is measured as the time that it takes, subsequent to incorporation of the promoter-catalyst system, for gelation of occur at room temperature, and gelation is said to occur when the resin solution is no longer flowable. As a practical matter, it is necessary that a polyester resin have a sufficiently long pot life so that, after it is catalyzed and promoted by the additions of a peroxy compound and accelerator, respectively, there still remains sufficient time to pour, spread or otherwise arrange the resin into the shape or form desired in the hardened, rigid state, before it becomes non-flowable. On the other hand, it is frequently highly desirable, particularly in room temperature curing applications, for the polyester resins to have a rather short pot life (e.g., 15 minutes) whereby gelation will occur very quickly after the aforesaid spreading or otherwise arranging operation, so as to eliminate flow-off, disarrangement, etc., which otherwise occurs and which usually requires time-consuming, continued spreading, reforming and rearranging until gelation does finally set in.

While certain of the presently-known catalyst-promoter systems for polyester resins do achieve optimum results in one or more of the four criteria described above, they leave much to be desired in the matter of achieving desirable balances of values in all four criteria.

In certain special applications of polyester resin compositions, specifically, those that comprise pigments, it has been found that the latter, particularly those containing cadmium, often function as strong inhibitors for the known catalyst-promoter systems. The problem is complicated by the fact that, upon increase of the amount of known promoters in polyester resins containing pigments that have the inherent inhibitive function referred to (in an attempt to overcome such inhibitive action), the promoters per se tend to discolor the compositions, whereby a dilemma is posed.

Another known difficulty with polyester compositions that contain a promoter and peroxy-catalyst system, is that while they may achieve varying degrees of fair or good results in the criteria discussed above, they may have the tendency to cause uncontrolled or run-away reactions due to over-promotion of the peroxy-catalyst. As a consequence, hot spots in localized areas of the curing mass may occur with resultant serious flaws in the finished products that are obtained therefrom.

In view of the foregoing, it is a primary object of the present invention to provide methods of effecting cure of unsaturated polyester resins at rapid rates.

It is another object of the present invention to provide such methods referred to above that result in optimum balances of the criteria for promoter effect; namely, gel time, time of exotherm, peak exotherm, and pot life.

It is yet another object of the invention to provide novel compositions that cure rapidly upon the addition of a substance chosen from a specified class of peroxy catalysts.

It is yet another object of the invention to provide methods for effecting rapid cure of polyester resins that contain inhibitive pigments, without adversely affecting the color of such compositions.

It is yet another object of the invention to provide polyester resin compositions that contain inhibitive pigments and promoters, and which cure rapidly upon the addition of a peroxy catalyst of a specified class, without any adverse effect on the color of such compositions.

Other objects, purposes and advantages of the present invention will appear to those skilled in the art upon reading the description of the invention that follows.

In general, the invention resides in a method of effecting cure of unsaturated polyester resins derived from polyhydric alcohol and unsaturated polycarboxylic acid, which comprises incorporating therein as catalyst-promoter system, a tertiary hydroperoxide as hereinafter defined and a substance that contains a vanadium atom therein in an oxidation state of less than 5. The invention also comprises the production of polymerizable unsaturated polyester resin compositions that comprise (a) an esterification reaction product of polyhydric alcohol and unsaturated polycarboxylic acid, and (b) an organic solvent-soluble vanadium compound that contains a vanadium atom in an oxidation state of less than 5, which compositions are particularly adaptable for quick curing by the addition of a peroxy catalyst chosen from certain tertiary hydroperoxides. Preferably, in accordance with the invention, both in exerising the method and in the production of the product, a compound containing at least one $CH_2=C<$ group and having a boiling point above 60° C. and copolymerizable with the unsaturated polyester resin, is included.

As polybasic component of the unsaturated polyester resin, there may be chosen an alpha-beta dibasic organic acid, of which are preferred, maleic, fumaric, glutaconic, itaconic, mesaconic, and citraconic. Maleic, itaconic or citraconic anhydrides may be used instead of the corresponding acids. Other isomers of the maleic series, typified by allyl-malonic, allyl-succinic, and xeronic acids may also be used in the production of the polyesters. Also employable are certain polybasic acids which decompose under heat to yield acids of the maleic type, such as malic and citric acids. Unsaturated dibasic organic acids admixed with other dibasic acids, such as phthalic, tetrachlorophthalic, hexachloroendomethylene tetrahydrophthalic (or their anhydrides), adipic, sebacic, etc. are similarly useful. The foregoing listing of acids with which polyesters may be prepared is to be understood as merely illustrative and not limitative, it merely being preferred that the polyester be an unsaturated polyester wherein at least 20 mol percent of the polycarboxylic acid is alpha-beta unsaturated polycarboxylic acid or anhydride.

Of the polyhydric alcohols which are known to be useful in the production of unsaturated polyester resins to which the present invention pertains, there may be chosen dihydric alcohols and mixtures thereof, or mixtures of dihydric alcohols and small amounts of higher polyhydric alcohols. The glycols, such as diethylene glycol, triethylene glycol, trimethylene glycol, monoethylene and propylene glycol and derivatives thereof, may also be used. Examples of higher polyhydric alcohols which may be employed in the production of the polyester contemplated, in amounts not exceeding about 5 mol percent, are glycerol, pentaerythritol, mannitol, etc. Also employable as part or all of the dihydric alcohols to be used, are the more complex glycols of the bisphenol A type, such as those disclosed in U.S. Patent No. 2,331,265.

The unsaturated polyester resins for which the present invention has been found to be most useful are those that are manufactured from polyhydric alcohol and unsaturated polybasic acid by standard and well known polyesterification techniques, to have acid numbers not greater than 50, although resins having acid numbers as high as 100 may be used and may even be desirable in some cases. Generally, the acid number should be as low as possible and particularly good results are obtained when the polyester resin used has an acid number between 15 and 50.

A polymerizable unsaturated monomeric substance that may be included with the unsaturated polyester resins in conventional manner and in the practice of the present invention, may be any substance (or mixture of such substances) whose moleccle contains at least one polymerizable ethylenic double bond that is capable of copolymerizing with the polymerizable unsaturated polyhydric acid-polycarboxylic acid polyester. Examples of such monomeric substances are now well known in the polyester art, and include, merely by way of example, styrene, p-methyl styrene, vinyl toluene, divinyl benzene, methyl arcylate, methyl methacrylate, acrolein, diallyl phthalate, triallyl cyanurate, the diallyl ester of endomethylene tetrahydrophthalic anhydride, etc.

The tertiary hydroperoxide catalyst may be an aralkyl hydroperoxide having the following formula:

where $R_1$ is an aryl group, $R_2$ and $R_3$ are alkyl groups and any of $R_1$, $R_2$ or $R_3$ may contain substituents attached thereto, other than halogens or other atoms or groups which might adversely affect the character of the hydroperoxide linkage. Examples of such hydroperoxides are cumene hydroperoxide, cymene hydroperoxide, sec-butylbenzene hydroperoxide, 1-methyltetralin hydroperoxide, etc. Generally, the tertiary hydroperoxide may be incorporated in amounts ranging from about 0.5% to about 3% by weight of the total polyester resin composition (including monomer if incorporated) to be cured depending upon the hydroperoxide used, the total amount of peroxy catalyst to be used (as will appear from the description hereinafter), the amount and kind of vanadium compound chosen as promoter, and the extent of catalytic action desired for the polyester resin composition chosen.

The promoter to be used in conjunction with the tertiary hydroperoxide to form the system in accordance with the present invention may comprise any vanadium-containing organic substance wherein the vanadium atom is in an oxidation state of less than 5. Preferably, the vanadium-containing organic substance should be soluble in the polyester resin composition with which it is incorporated. Examples of vanadium-containing substances, useful in exercising the invention are vanadium naphthenate, vanadyl hexamethylene tetramine, vanadyl 8-hydroxyquinolinate, vanadyl diethyldithiocarbamate, vanadium tetramandelate, vanadyl disalicylal ethylenediimine, vanadyl disalicylal ethylenediimine monopyridinate, etc. The vanadium-containing substance may be incorporated in amounts ranging from about 0.003% to about 0.5% by weight of the total polester resin composition depending, as in the case of tertiary hydroperoxide chosen, upon the substance utilized, the kind and amount of catalyst to be incorporated, and the extent of promoter action desired.

In many instances, it may be desirable to include with the hydroperoxide catalyst of the type described above, a second peroxy catalyst such as benzoyl peroxide. To obtain the benefits of the invention, which include a lower cost of the catalyst system, in addition to the optimum balance of gelling and curing characteristics as defined by the test-criteria referred to hereinbefore; the amount of benzoyl peroxide, when included, is kept preferably within 40% of the total peroxy catalyst employed.

In the exercising of the invention, the unsaturated polyester chosen to be used is preferably mixed with a monomer as referred to above, and the organic vanadium composition, chosen to function as promoter, is thoroughly mixed into the polyester-monomer mixture. Thereafter, and at a predetermined time before the ultimate use of the unsaturated polyester composition for curing, a hydroperoxide of the type described above is incorporated as catalyst. The predetermined time is dependent upon the proportions of ingredients employed chosen for a particular application since, as a feature of the invention, sufficient time is allowed by the use of the novel promoter-catalyst system described herein, to permit placement of the polyester composition where it is intended to be cured. Thereafter, the polyester resin begins to gel so that continued working thereof, to assure that it is in the desired shape and/or position at the time ultimate hardening occurs, is minimized or unnecessary.

In order to demonstrate the novel function of the organic vanadium compounds as promoters of hydroperoxide catalysts of the described class of which cumene hydroperoxide is a preferred example, the following experiment was performed:

A polyester was selected that had been prepared from equimolar quantities of phthalic and maleic anhydrides and a 10% molal excess of an equivalent amount of propylene glycol, by a conventional esterification heat reaction, under an atmosphere of $CO_2$. The esterification had been continued until the resulting polyester had an acid number of 30–40. Thereafter, the unsaturated polyester had been thoroughly mixed with and dissolved in sufficient styrene so that the latter constituted 34.5% of the total weight of the final solution. The resin also contained a very small amount of p.tertiary butyl catechol by reason of its presence in the styrene as obtained commercially, and about 0.015 wt. percent of hydroquinone incorporated in the polyester-styrene mixture as inhibitor to increase the storage life of the resin solution as is conventional in the art.

Then, in accordance with the SPI Gel Time Determination procedure referred to previously, 1.0 wt. percent of 73.2% cumene hydroperoxide (the remainder comprising inert hydrocarbon), and 0.25% benzoyl peroxide was incorporated into a sample of the polyester-monomer solution. The catalyzed sample was then divided into two portions, and into one there was incorporated 0.0216% vanadium in the form of vanadium naphthenate. Again, in accordance with the SPI Gel Time Determination, a 19 x 150 mm. test tube was filled to a depth of 3 inches with the catalyzed and promoted resin solution, henceforth designated solution "A"; while a second equally dimensioned test tube was filled to the same depth with the catalyzed but unpromoted resin solution, henceforth designated solution "B." A thermocouple attached to a recording device was inserted into the center of each of the resin solution masses "A" and "B," respectively.

The test tubes so prepared were then placed into a bath maintained at 180° F. The temperatures of both resin solutions were seen to rise. The heat generated accelerated the functioning of the promoter and catalyst in the case "A" and of the catalyst alone in "B" and as polymerization commenced, the temperature of each resin solution rose rapidly beyond the bath temperature to a peak temperature, and finally the resins were observed to harden. As the foregoing occurred observations were made and recorded.

Specifically, the time interval that it took for the resin solutions to pass from 150° to 190° F. was recorded, which under the SPI Gel Time Determination is empirically defined and referred to as the "gel time." Also observed and recorded were the time intervals measured from 150° F. that it took for the samples to reach the highest or peak temperatures. This, under the tests, is referred to as "time of exotherm." Finally, the actually highest temperatures reached by the resin solutions were observed and recorded. This is referred to as "peak exotherm." In addition to the foregoing, the room temperature pot life of each polyester resin solution was observed and recorded by introducing 80 gm. samples of each of the two resin solutions into 150 ml. beakers and allowing them to set at room temperature. The samples were checked frequently and the pot life of each measured as the time that it took for gelation to occur. The comparative results of the foregoing tests are given in Table I below:

TABLE I

| Sample | Gel Time, min. sec. | Time of Exotherm, min. sec. | Peak Exotherm, ° F. | Pot Life |
| --- | --- | --- | --- | --- |
| A (containing catalyst and promoter) | 00:40 | 1:55 | 384 | 15 min. |
| B (containing catalyst only) | 23:00 | 28:40 | 198 | >24 hrs. |

To demonstrate that when the unsaturated polyester resin includes a strongly inhibitive pigment, the vanadium compound promoted tertiary hydroperoxide catalyst system of the invention have particular usefulness, the following experiments were undertaken:

A sample of unsaturated polyester as described for sample "A" above had incorporated therein, in amount that was 3.76% by weight of the unsaturated polyester sample, a strongly inhibitive yellow pigment paste commercially obtainable as Corrulux J–21 and having the following formulation:

5.34% Ferro-F 5512 yellow (that contains 83% cadmium sulfide-cadmium selenide mixture and 17% zinc sulfide)
0.29% zinc oxide
14.48% titanium oxide 79.89% polyester resin (comprising the condensation product of 5.319 mols propylene glycol, 2.46 mols maleic anhydride, and 2.47 mols phthalic anhydride)

To this pigmented unsaturated polyester resin was added 1 weight percent of cumene hydroperoxide.

The sample was divided into four portions, and into one, henceforth designated sample portion "F"; there was also incorporated 0.05 weight percent of vanadium naphthenate. In a second portion, henceforth designated as sample "G," there was included, instead of the vanadium naphthenate, hydrazo-benzene in amount that was 0.1% of the sample. In a third portion, henceforth designated "H," the unsaturated polyester resin had incorporated therein, a cobalt naphthenate methyl-ethyl-ketone peroxide promoter-catalyst system wherein 0.06% cobalt naphthenate and 1.0% methyl-ethyl-ketone peroxide were utilized. The results of the 150° Gel Time Determination, and color tests of these three samples are given below in Table II:

TABLE II

| Sample Portion | Gel Time, min. sec. | Time of Exotherm, min. sec. | Peak Exotherm, °F. | Color |
| --- | --- | --- | --- | --- |
| F | 11:40 | 18:40 | 414 | original yellow. |
| G | 12:40 | about 45 min. | | reddish orange. |
| H | 20:45 | 27:00 | 402 | off color. |

The superiority of the catalyzed and promoted compositions of the invention is evident from the above, as are the surprising results obtained by the inclusion of the vanadium compound promoter-tertiary hydroperoxide catalyst system of the invention.

The following typical formulations are given by way of example to illustrate the methods and compositions of this invention. All parts are given by weight.

*Example 1*

An unsaturated polyester resin was prepared in conventional manner from equimolar amounts of maleic and phthalic anhydrides and a substantially equivalent amount (10% molar excess) of propylene glycol. Specifically, a mixture of the foregoing components was heated under an atmosphere of $CO_2$ at a temperature of about 210° C. for 6–8 hours, at which time the acid number had fallen to between 25 and 30. The resulting polyester resin was then combined with the remaining constituents of the composition in the following proportions (by weight):

| | |
| --- | --- |
| Polyester resin | 65.5 |
| Styrene | 34.5 |
| Hydroquinone | 0.015 |

(a) In accordance with the invention, there was incorporated 0.06% of vanadyl hexamethylenetetramine into a batch of the polyester described above.

(b) In another batch of the same polyester there was incorporated 0.06% of vanadyl 8-hydroxyquinolinate.

(c) In yet another batch of the polyester, there was incorporated 0.06% of vanadyl diethyldithiocarbamate.

The foregoing polyester compositions were found to be stable on storage up to 6–12 months.

At the time of contemplated use, there was incorporated into each of the promoted polyester compositions 1 part by weight cumene hydroperoxide. Promoted and catalyzed unsaturated polyester resin compositions prepared as above may be employed as desired, such as for castings, in the formation of laminates, in hand lay-up operations, etc.

To demonstrate the advantage of the foregoing promoted and catalyzed unsaturated polyester resin compositions, SPI Gel Time Determination tests and room temperature pot life tests were made of samples of such compositions. The comparative results thereof are given in Table III below:

TABLE III

| Batch | Gel Time, min. sec. | Time of Exotherm, min. sec. | Peak Exotherm, °F. | Pot Life min. |
| --- | --- | --- | --- | --- |
| (a) | 2:5 | 5:10 | 349 | 3 |
| (b) | 1:50 | 3:40 | 395 | 45 |
| (c) | 1:10 | 2:50 | 384 | 30 |

*Example 2*

A polyester resin was prepared in conventional manner from components consisting of 23.7% maleic anhydride, 35.8% phthalic anhydride, and 40.48% propylene glycol, to which was added 0.015% hydroquinone as conventional polymerization inhibitor, by heating a mixture thereof. The heating was carried out under a $CO_2$ atmosphere at a temperature of about 210° C. for 6–8 hours, at which time the acid number has fallen to between 25 and 30. Eighty-three parts of the polyester resin so produced were mixed with 17 parts styrene. There was then added to the styrene-thinned polyester, 3.76% of the Corrulux J–21 yellow pigment paste described hereinbefore. In the foregoing pigmented unsaturated polyester resin composition there was added .05% of vanadium naphthenate. Subsequently, at the time it was desired to use the composition, 1.0% of cumene hydroperoxide and 0.2% of benzoyl peroxide were introduced into the composition. The desired characteristics of the composition, as indicated by the 150° tests are given below in Table IV:

TABLE IV

| Gel Time, min. sec. | Time of Exotherm, min. sec. | Peak Exotherm, °F. |
| --- | --- | --- |
| 11:40 | 18:40 | 414 |

In addition to the above described promoted and catalyzed yellow pigmented unsaturated polyester resin compositions, having the optimum curing characteristics indicated by the data in Table IV above, architectural sheetings obtained by using the compositions as binder for glass fibers have the desired yellow pigmentation with no undesirable discoloration.

It is to be understood that the constituents of the polyester compositions in the foregoing examples have been selected as representative of the materials normally found in such compositions, and that the advantages obtained by the invention are unaffected by conventional substitutions or omissions. For instance, similar results are obtained if the styrene is replaced in whole or part by methyl methacrylate or other known cross-linking monomer. Instead of the incorporation of glass fibers in the resin compositions, other fibers such as asbestos fibers and the like may be substituted or obviously omitted altogether if the compositions are to be used in casting applications, for example. Similarly, other filler materials may be included, stabilizer may be omitted if the compositions are to be used immediately, and/or other conventional stabilizers, pigments and other additions may be added or substituted for those disclosed.

Furthermore, hte relative proportions of the constituents listed in the examples or the substituents therefor listed in the foregoing paragraph, as well as hereinbefore, and/or known in the polyester resin art, may be varied within very wide limits. Thus, the unsaturated polyester resin constituents can be varied, and the proportion of monomer polyester resin in the unsaturated polyester combination may likewise vary between very wide limits. Moreover, the proportions of stabilizers (when used), promoter, and catalysts can be varied to give the desired combination of shelf life and pot life, as well as gel time and cure time characteristics.

Having described the invention, we claim:

1. A method of effecting final cure of unsaturated polyester resins derived from polyhydric alcohol of which at least 95% thereof is dihydric alcohol and alpha-beta ethylenically unsaturated polycarboxylic acid and having an acid number no higher than 100 which comprises: incorporating therein, (A) as a copolymerizable system, a compound containing at least one $CH_2=C<$ group and having a boiling point above 60° C., and (B) as a catalyst-promoter system (1) a catalytic amount not above about 3.0% by weight of the finally cured polyester resin of a tertiary aralkyl hydroperoxide catalyst and (2) an amount not above about 0.5% by weight of the finally cured polyester resin of a soluble organic compound that contains a vanadium atom therein in an oxidation state of less than 5.

2. A method of effecting final cure as claimed in claim 1, wherein the vanadium atom containing organic compound is a vanadium salt.

3. A method of effecting final cure as claimed in claim 1, wherein the vanadium atom containing organic compound is vanadium naphthenate.

4. A method of effecting final cure as claimed in claim 1, wherein the tertiary aralkyl hydroperoxide is cumene hydroperoxide.

5. An unsaturated polyester resin composition comprising (A) an esterification reaction product of (1) polyhydric alcohol of which at least 95% thereof is dihydric alcohol and (2) dicarboxylic acid that comprises, in an amount that is at least 20 mol percent thereof, alpha-beta ethylenically unsaturated dicarboxylic acid, said esterification product having an acid number no higher than 100, (B) a copolymerizable substance having at least one $CH_2=C<$ group and having a boiling point of at least 60° C., (C) an amount not above about 0.5% by weight of said composition of a soluble organic compound that contains a vanadium atom in an oxidation state of less than 5, and (D) a catalytic amount not above about 3.0% by weight of said composition of a tertiary aralkyl hydroperoxide catalyst.

References Cited in the file of this patent

UNITED STATES PATENTS

| | | |
|---|---|---|
| 2,255,313 | Ellis | Sept. 9, 1941 |
| 2,584,773 | Reynolds et al. | Feb. 5, 1952 |
| 2,607,705 | Kumins | Aug. 19, 1952 |
| 2,642,410 | Hoppens | June 16, 1953 |
| 2,683,140 | Howard | July 6, 1954 |
| 2,928,804 | Foster et al. | Mar. 15, 1960 |

FOREIGN PATENTS

| | | |
|---|---|---|
| 630,158 | Great Britain | Oct. 6, 1949 |

UNITED STATES PATENT OFFICE
CERTIFICATE OF CORRECTION

Patent No. 3,079,363                    February 26, 1963

Stanley D. Koch et al.

It is hereby certified that error appears in the above numbered patent requiring correction and that the said Letters Patent should read as corrected below.

Column 2, line 13, for "no-dodecylmercaptan" read -- n-dodecylmercaptan --; line 60, for "of" read -- to --; column 4, line 52, for "moleccle" read -- molecule --; column 5, line 58, for "of" read -- for --; column 8, line 67, for "hte" read -- the --.

Signed and sealed this 22nd day of October 1963.

(SEAL)
Attest:

ERNEST W. SWIDER
Attesting Officer

EDWIN L. REYNOLDS
Acting Commissioner of Patents